US010605328B2

(12) United States Patent
Imano et al.

(10) Patent No.: US 10,605,328 B2
(45) Date of Patent: Mar. 31, 2020

(54) COUNTERWEIGHT, AND CRANKSHAFT WITH THE COUNTERWEIGHT

(71) Applicant: Mazda Motor Corporation, Aki-gun, Hiroshima (JP)

(72) Inventors: Yasuyuki Imano, Hiroshima (JP); Masaki Fukuma, Hiroshima (JP); Satoshi Imamura, Hiroshima (JP); Hisashi Kajikawa, Aki-gun (JP); Toshinobu Yoneya, Hiroshima (JP); Ryoko Motohiro, Hiroshima (JP); Yuichi Someno, Aki-gun (JP); Takahiro Iwai, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 16/048,623

(22) Filed: Jul. 30, 2018

(65) Prior Publication Data
US 2019/0040932 A1 Feb. 7, 2019

(30) Foreign Application Priority Data
Aug. 1, 2017 (JP) .................................. 2017-149429

(51) Int. Cl.
*F16F 15/28* (2006.01)
*F16C 3/08* (2006.01)
(Continued)

(52) U.S. Cl.
CPC .............. *F16F 15/283* (2013.01); *F16C 3/08* (2013.01); *F16F 15/26* (2013.01); *F02B 75/20* (2013.01);
(Continued)

(58) Field of Classification Search
CPC .......... F16F 15/283; F16F 15/26; F16F 15/28; F16C 3/08; F16C 3/20; F16C 3/06; Y10T 74/2183; B21K 1/08
See application file for complete search history.

(56) References Cited

U.S. PATENT DOCUMENTS

| 8,757,027 B2* | 6/2014 | Williams | F16C 3/20 123/192.2 |
| 9,121,472 B2* | 9/2015 | Lach | F16F 15/283 |

(Continued)

FOREIGN PATENT DOCUMENTS

| DE | 19745586 A1 | 4/1998 |
| EP | 0345424 A1 | 12/1989 |

(Continued)

*Primary Examiner* — Jeremy R Severson
(74) *Attorney, Agent, or Firm* — Alleman Hall Creasman & Tuttle LLP

(57) ABSTRACT

A counterweight forms a crankshaft of an engine, and includes: an arm connecting a crank journal and crank pin of the crankshaft; a neck extending from a first connection face of the arm in a direction opposite to the crank pin; and a substantially fan-shaped weight continuous with a portion of the neck opposite to the crank journal. The weight has left and right shoulders continuous with the neck, and each of the shoulders is tilted to be away from the neck at an angle with respect to a horizontal line orthogonal to a crankshaft center when viewed along the crankshaft center, the angle being 15° or more and 22.5° or less.

4 Claims, 7 Drawing Sheets

(51) Int. Cl.
*F16F 15/26* (2006.01)
*F02B 75/20* (2006.01)
*F02B 75/18* (2006.01)

(52) U.S. Cl.
CPC ... *F02B 2075/1816* (2013.01); *Y10T 74/2183* (2015.01)

(56) References Cited

U.S. PATENT DOCUMENTS

| | | |
|---|---|---|
| 9,261,131 B2 | 2/2016 | Harada et al. |
| 10,066,699 B2 * | 9/2018 | Ono ..................... F16F 15/283 |
| 2016/0223943 A1 | 8/2016 | Goto |

FOREIGN PATENT DOCUMENTS

| | | |
|---|---|---|
| JP | 2015016476 A | 1/2015 |
| JP | 5841977 B2 | 1/2016 |
| JP | 2016107271 A | 6/2016 |

* cited by examiner

COUNTERWEIGHT, AND CRANKSHAFT WITH THE COUNTERWEIGHT

CROSS-REFERENCE TO RELATED APPLICATION

This application claims priority to Japanese Patent Application No. 2017-149429 filed on Aug. 1, 2017, the entire disclosure of which is incorporated by reference herein.

BACKGROUND

The present disclosure relates to a counterweight provided for a crankshaft of an engine, and a crankshaft provided with the counterweight.

As disclosed by Japanese Patent No. 5841977, for example, a counterweight has been provided for a crankshaft of an engine to create unbalance, thereby canceling a reciprocating inertia force.

SUMMARY

To make the crankshaft lightweight, the shape of the counterweight may be adjusted. If doing so, however, a portion corresponding to the counterweight may disadvantageously become less filled in a process of forging the crankshaft.

In view of the foregoing, the present disclosure is aimed to provide a counterweight which can make a crankshaft lightweight, and allows a counterweight portion to be filled sufficiently in a forging process of the crankshaft, and a crankshaft provided with the counterweight.

The counterweight disclosed herein forms a crankshaft of an engine, and includes: an arm connecting a crank journal and crank pin of the crankshaft; a neck extending from a junction between the arm and the crank journal in a direction opposite to the crank pin with respect to a crankshaft center; and a weight continuous with a portion of the neck opposite to the arm, the weight being substantially fan-shaped when viewed along the crankshaft, wherein the weight has left and right shoulders continuous with the neck, each of the shoulders being tilted to be away from the neck at an angle with respect to a horizontal direction orthogonal to the crankshaft center when viewed along the crankshaft, the angle being 15° or more and 22.5° or less.

If the angle formed by the shoulder of the counterweight and the horizontal direction orthogonal to the crankshaft center is made smaller, the distance from the crankshaft center to the center of gravity of the counterweight can be made larger. Thus, the counterweight can be made lightweight, while maintaining unbalance required for the counterweight to function properly. On the other hand, if the angle is made larger, the counterweight is filled more sufficiently in the forging process.

According to the present disclosure, the angle formed by the shoulder of the counterweight and the horizontal direction orthogonal to the crankshaft center is set within the above-described range. This can make the counterweight lightweight, and allows the counterweight to be filled sufficiently in the forging process.

In one preferred embodiment, when viewed along the crankshaft, a ratio $h/R$ of a width $h$ of the neck to a radius $R$ of the counterweight from the crankshaft center is 0.44 or more and 0.49 or less.

In this configuration, the ratio $h/R$ is set within the above-described range. Thus, the counterweight can be made lightweight, while keeping in balance with the filling of the counterweight in the forging process.

Further, a crankshaft disclosed herein includes the counterweight described above.

In this configuration, a lightweight, high-performance crankshaft can be provided. This can contribute to improved fuel efficiency and reduced vehicle weight.

As can be seen in the foregoing, the present disclosure controls the angle formed by the shoulder of the counterweight and the horizontal direction orthogonal to the crankshaft center within the above-described range. This can make the counterweight lightweight, and allows the counterweight to be filled sufficiently in the forging process.

DETAILED DESCRIPTION

Embodiments of the present disclosure will be described in detail below with reference to the drawings. The following embodiments are merely exemplary ones in nature, and are not intended to limit the scope, applications, or use of the invention.

First Embodiment

<Crankshaft>

Figure 1:
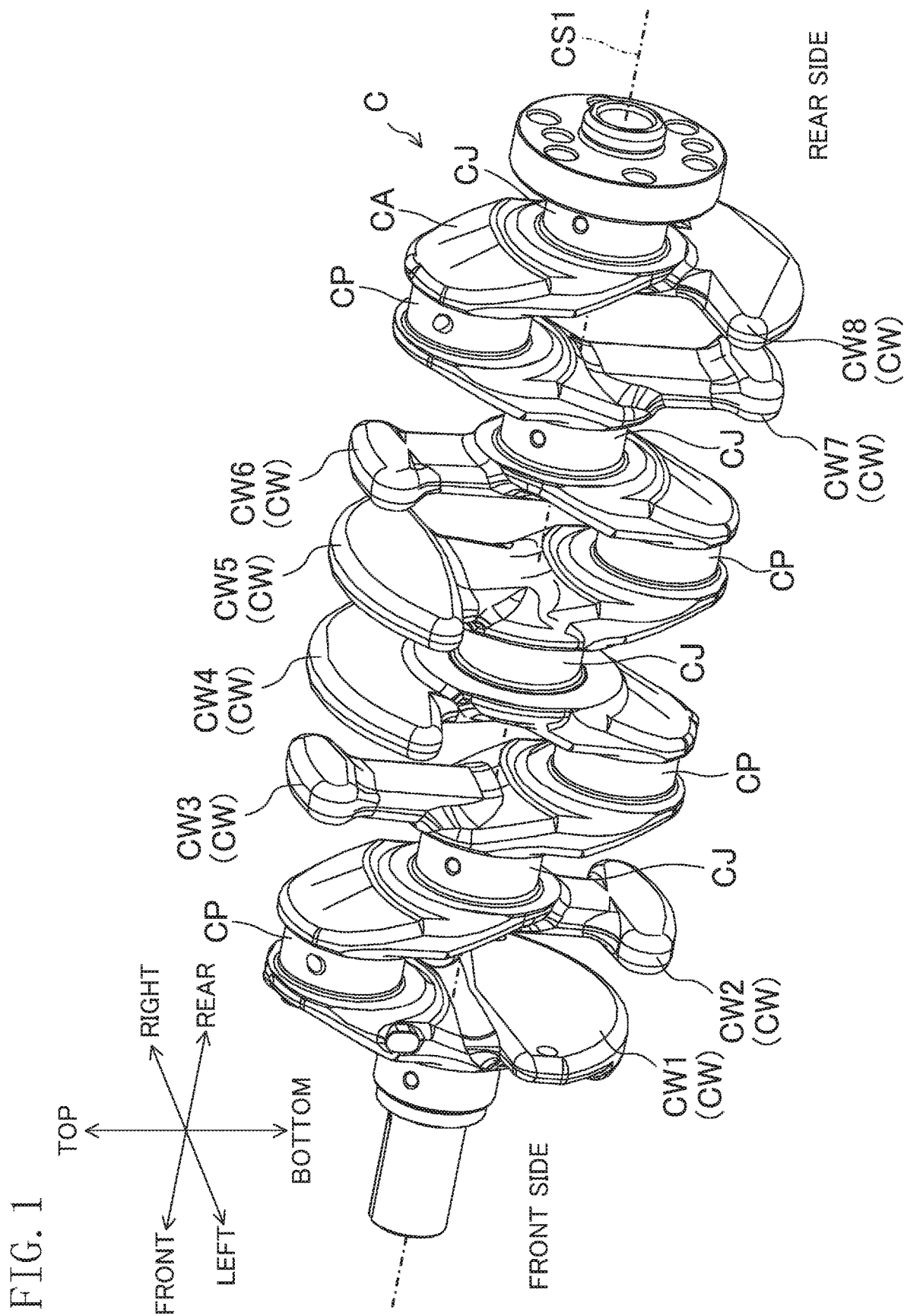
FIG. 1 is a perspective view of a crankshaft provided with a counterweight according to an embodiment.
Figure 2:
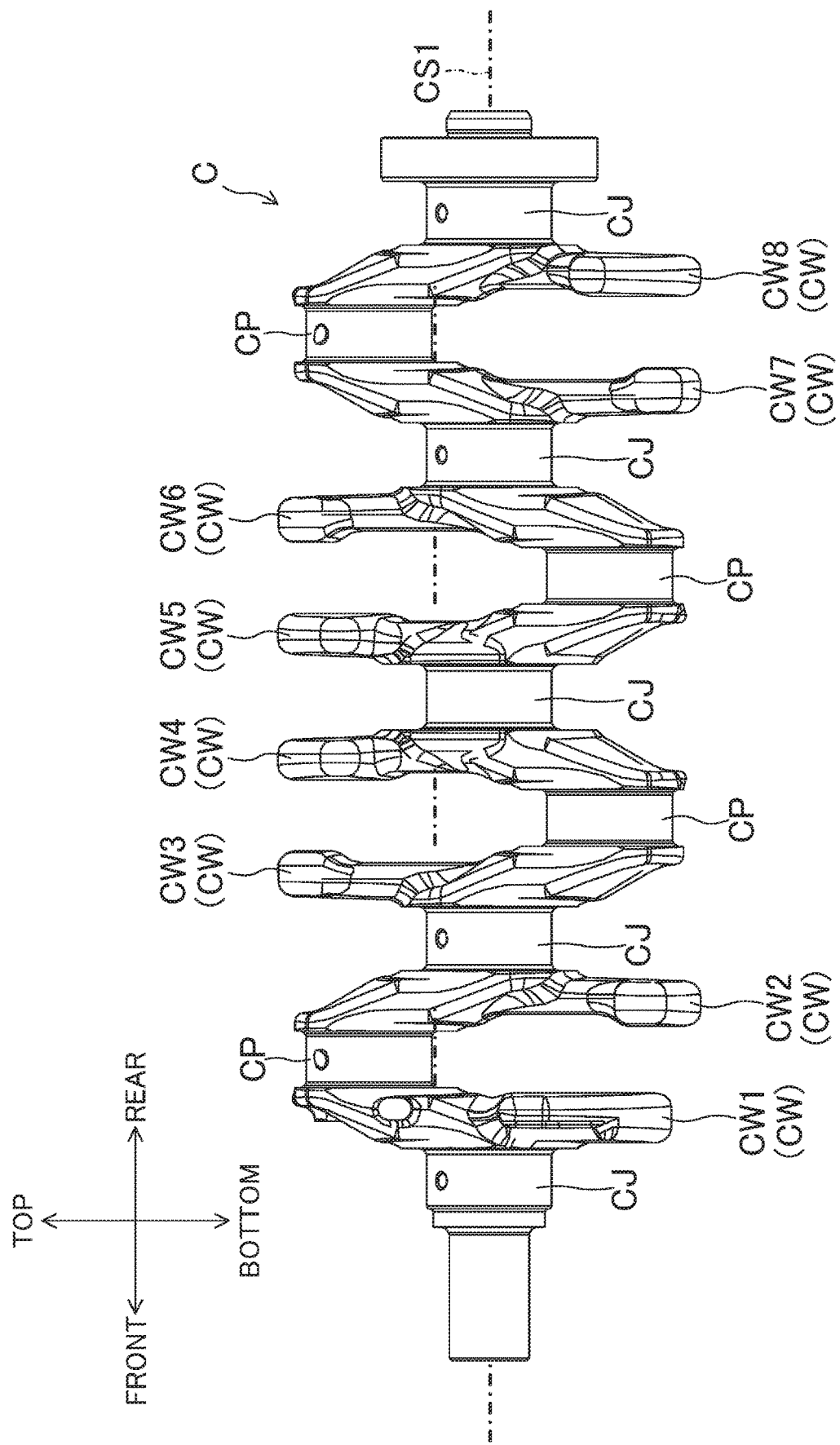
FIG. 2 is a side view of the crankshaft of FIG. 1.

FIGS. 1 and 2 show a crankshaft C provided with a counterweight CW8 according to this embodiment.

The crankshaft C is provided for a longitudinal in-line four-cylinder gasoline engine. Note that the counterweight CW8 of this embodiment is used not only for the longitudinal in-line four-cylinder engine, but may also be used for the crankshafts of various types of engines such as transverse engines, diesel engines, other in-line multi-cylinder engines, V-type multi-cylinder engines, and single-cylinder engines.

The crankshaft C includes crank journals CJ forming a main shaft thereof, crank pins CP to be connected to a connecting rod (not shown), and counterweights CW each having an arm CA connecting an associated pair of the crank journal CJ and the crank pin CP together. The center axis of the crankshaft C will be hereinafter referred to as a "crankshaft center CS1." The crankshaft center CS1 passes the centers of the crank journals CJ as will be described later.

The crankshaft C has five crank journals CJ which are pivotably supported by five bushings of a cylinder block (not shown). The crank journals CJ form a main shaft of the crankshaft C whose center is aligned with the crankshaft center CS1 of the crankshaft C. Four crank pins CP are provided to be shifted from the crankshaft center CS1 by a predetermined distance. Each crank pin CP is arranged between adjacent crank journals CJ. The crank pins CP are connected to a big end of a connecting rod (not shown), and function as starting points of a vertical motion of pistons as the crankshaft C rotates about the crankshaft center CS1.

—Direction—

Figure 5:
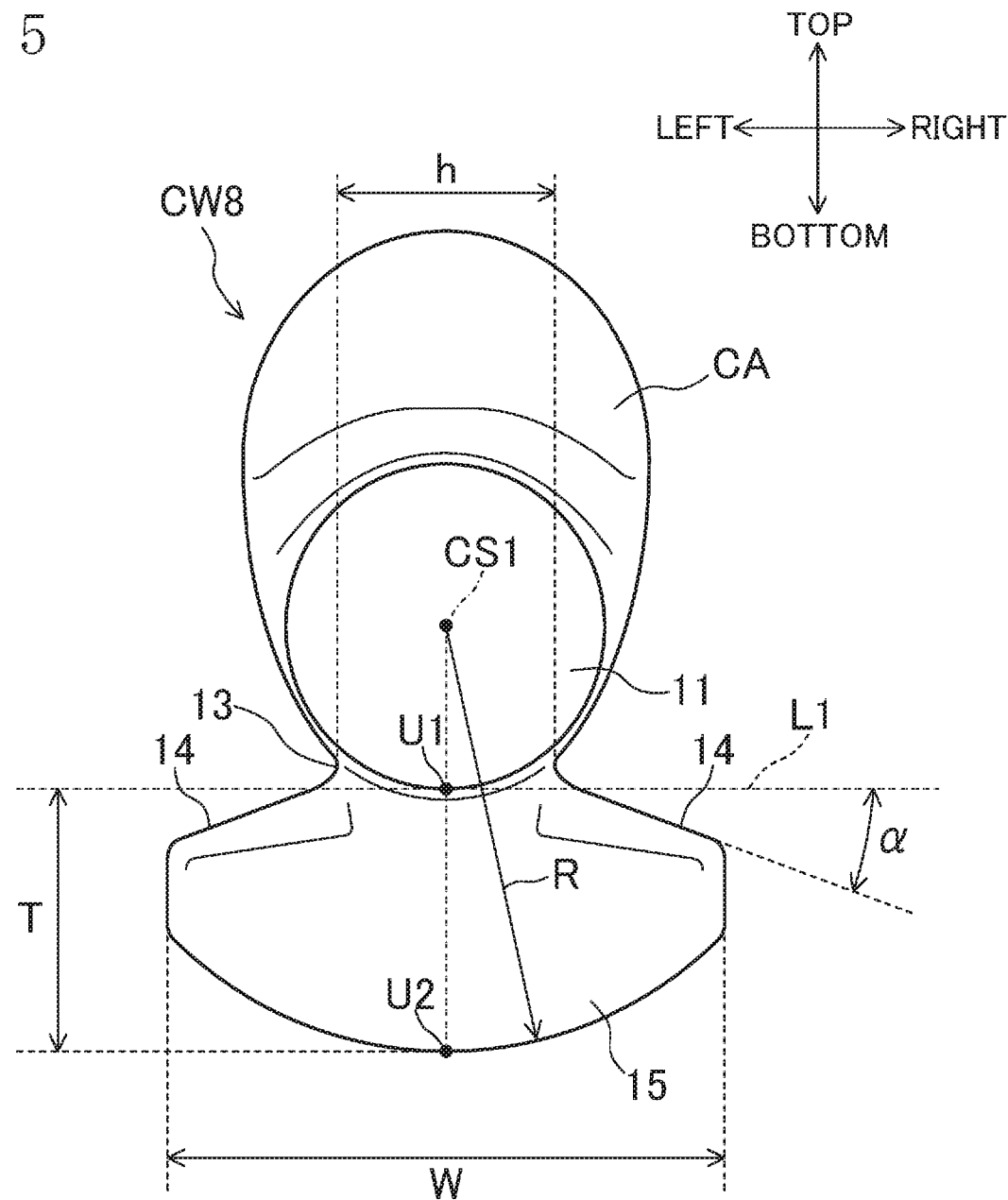
FIG. 5 is a back view of the counterweight of FIG. 4.

In this specification, a "longitudinal direction" includes directions toward the front and rear of the crankshaft C as shown in FIG. 1. The terms "when viewed along the crankshaft" and "when viewed along the crankshaft center CS1" have the same meaning, and indicate that an object is viewed from the front or behind. A "vertical direction" is orthogonal to the longitudinal direction as shown in FIG. 2, and includes an upward direction toward the crank pin CP, and a downward direction toward the crank journal CJ, with respect to the counterweight CW8. A "horizontal direction" refers to a direction orthogonal to the vertical direction when viewed from behind as shown in FIG. 5.

—Method of Manufacturing Crankshaft—

Figure 3:
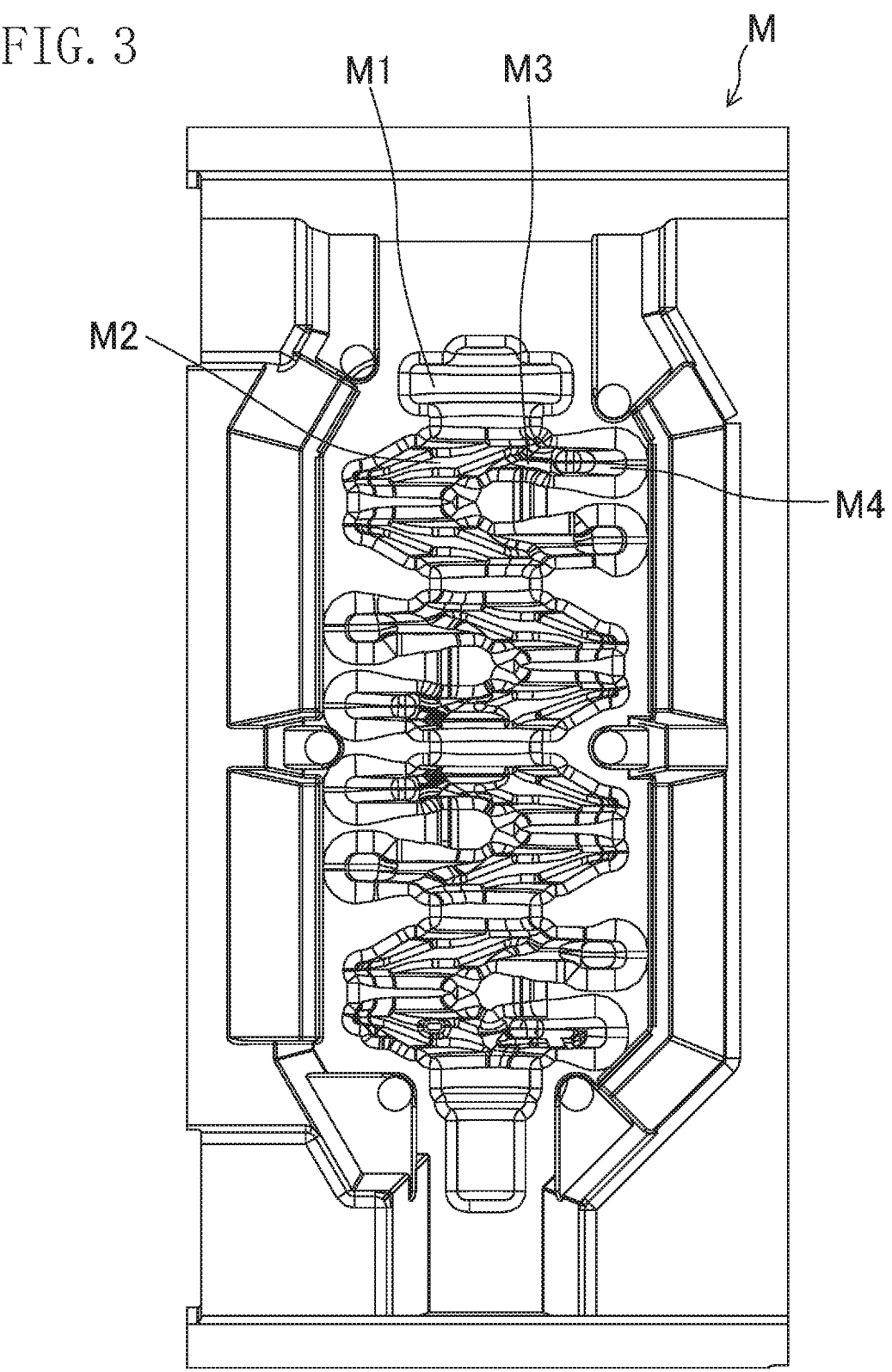
FIG. 3 is a plan view of a molding die (lower die) for forming the crankshaft of FIG.

The crankshaft C is forged into a single piece including the crank journals CJ, the crank pins CP, and the counterweights CW. FIG. 3 shows an example of a molding die used for a forging process. A die M is a lower die, and forms a cavity M1 for forming the crankshaft C when combined with an upper die (not shown) with their mating faces met together. The counterweight CW8 is formed in cavity portions M2 to M4. A neck 13 and a weight 15 of the counterweight CW8, which will be described later, are formed in the cavity portions M3 and M4, respectively. The amount of a metallic material filling the cavity portion M4 may be affected by the thickness of the neck 13 and the angle of a junction between the neck 13 and the weight 15.

<Counterweight>

The counterweight CW8 according to the embodiment will be described below.

A skeleton of the crankshaft C is comprised of eight counterweights CW, each of which is present between an adjacent pair of the crank journal CJ and the crank pin CP. In this specification, the eight counterweights CW arranged from the front to the rear are identified by reference characters CW1 to CW8 for the sake of convenience.

The counterweight CW8 according to this embodiment is the rearmost counterweight provided for the rear side of the crankshaft C. The counterweight CW8 according to this embodiment may be arranged at the position of any one of the counterweights CW1 to CW7, or two or more counterweights CW8 may be provided for the crankshaft C.

The counterweight CW8 includes, as described above, the arm CA, the neck 13 extending from the arm CA, and the weight 15 continuous with a portion of the neck 13 opposite to the arm CA.

—Arm—

Figure 4:
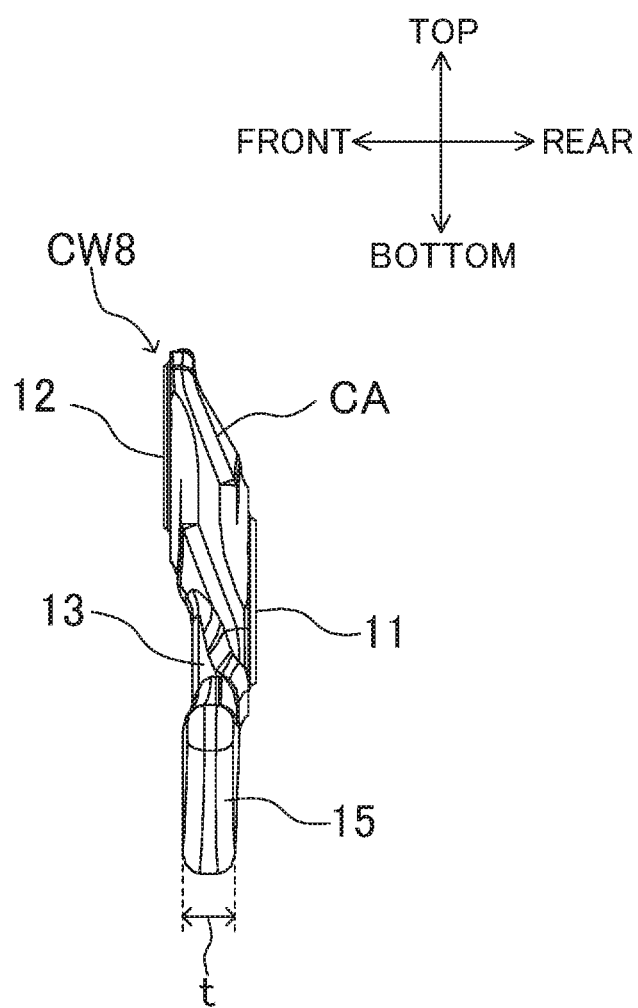
FIG. 4 is a side view of the counterweight according to the embodiment.

As shown in FIG. 4, the arm CA includes a first connection face 11 serving as a junction with the crank journal CJ, and a second connection face 12 serving as a junction with the crank pin CP.

When the counterweight CW8 is viewed from behind, the first connection face 11 is a substantially round face as shown in FIG. 5, and the crankshaft center CS1 is aligned with the center of the face.

Figure 6:
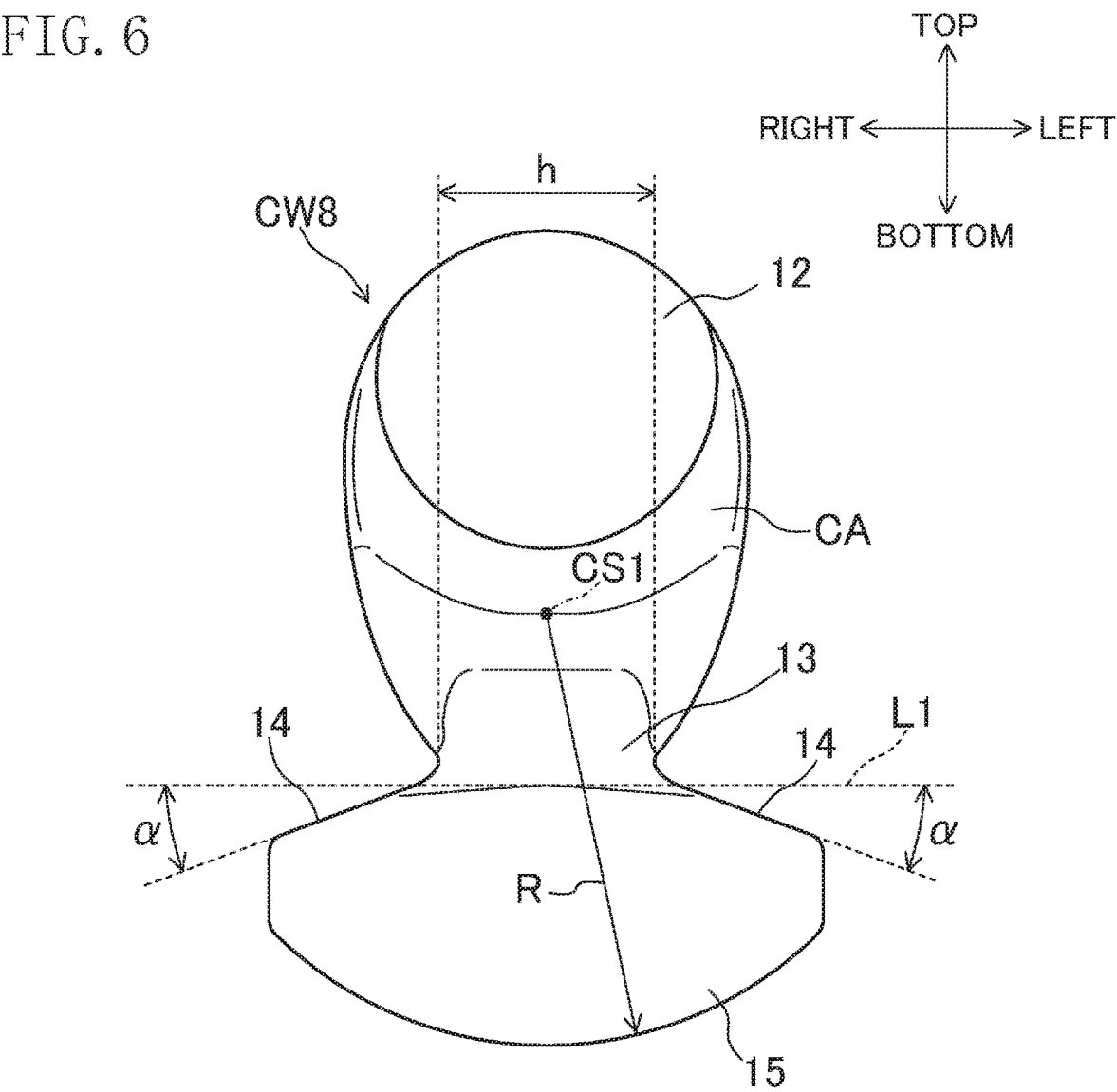
FIG. 6 is a front view of the counterweight of FIG. 4.

When the counterweight CW8 is viewed from the front, the second connection face 12 is a substantially round face with a slightly crushed top as shown in FIG. 6.

Note that the first and second connection faces 11 are 12 are described for the sake of convenience. In an actual process of manufacturing the crankshaft C, the crank journals CJ, the crank pins CP, and the counterweights CW are integrally molded into a single piece.

—Neck—

As shown in FIG. 4, the neck 13 extends downward from a portion of the arm CA adjacent to the first connection face 11, i.e., in a direction opposite to the crank pin CP.

The neck 13 allows the center of gravity of the counterweight CW to be shifted downward from the crankshaft center CS1, i.e., toward the weight 15.

Specifically, as shown in FIGS. 5 and 6, the center of gravity of the counterweight CW8 is shifted toward the weight 15 and the counterweight CW8 becomes lightweight with a decrease in width h, which is the width of the narrowest portion of the neck 13 in the horizontal direction. In this way, the counterweight CW can easily be made lightweight, while maintaining unbalance required for the counterweight CW to function properly.

—Weight—

As shown in FIGS. 4 to 6, the weight 15 for giving the unbalance required for the counterweight CW is continuous with a portion of the neck 13 toward the crank journal CJ, i.e., a portion opposite to the arm CA. The weight 15 is substantially fan-shaped.

When viewed along the crankshaft center CS1 as shown in FIGS. 5 and 6, suppose that a distance from the crankshaft center CS1 to the bottom of the weight 15 is a counterweight radius R, the bottom of the weight 15 draws a substantial arc with a radius corresponding with the counterweight radius R about the crankshaft center CS1. In this specification, the "substantial arc" includes an arc as part of a perfect circle, and an arc having a flat portion. The "substantially fan-shaped" weight may include a weight having a portion with the substantial arc.

As shown in FIG. 4, the thickness of the weight 15 of the counterweight CW8 in the longitudinal direction will be referred to as a weight thickness t. Further, as shown in FIG. 5, a distance from the lowermost point U1 of the first connection face 11 to the lowermost point U2 of the weight 15 will be referred to as a weight height T, and the maximum width of the weight 15 in the horizontal direction will be referred to as a weight width W. After the crankshaft C has been formed, the weight thickness t, the weight height T, and the weight width W are adjusted to control the unbalance of the counterweight CW8. Note that the ratio W/R is suitably 1 or more and less than 2 to ensure the unbalance of the counterweight CW8.

In this embodiment, as shown in FIGS. 5 and 6, the weight 15 of the counterweight CW8 has left and right shoulders 14 which extend smoothly to the left and right from the neck 13 with a downward tilt.

Specifically, the shoulders 14 extend from the neck 13 below a line L1, which is a straight phantom line passing the lowermost point U1 of the first connection face 11 and extending in the horizontal direction. In other words, when viewed along the crankshaft center CS1, each of the left and right shoulders 14 is tilted to be away from the neck 13 at an angle $\alpha$ with respect to a horizontal direction orthogonal to the crankshaft center CS1, i.e., the line L1.

The center of gravity of the counterweight CW8 can be further shifted downward with a decrease in the angle $\alpha$ formed by each shoulder 14 of the counterweight CW8 and the line L1. In this way, the counterweight CW8 can be made lightweight, while maintaining the unbalance required for the counterweight CW8. On the other hand, if the angle $\alpha$ decreases, the crankshaft C may become less filled in the forging process. Therefore, in one preferred embodiment, the angle $\alpha$ is made larger so that the crankshaft is filled sufficiently.

Figure 7:
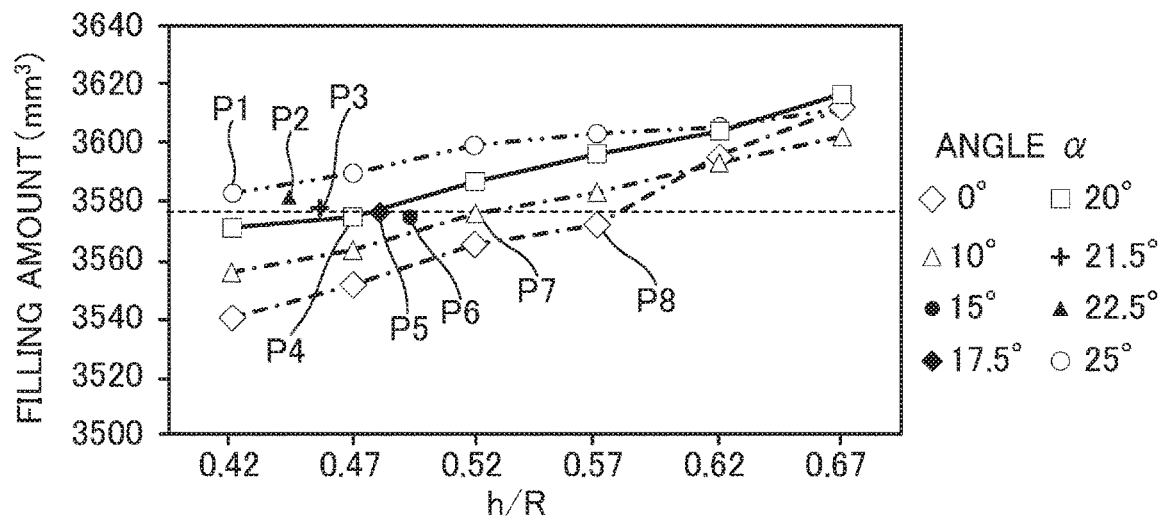
FIG. 7 is a graph showing how the filling amount varies depending on an angle $\alpha$ and a ratio $h/R$.
Figure 8:
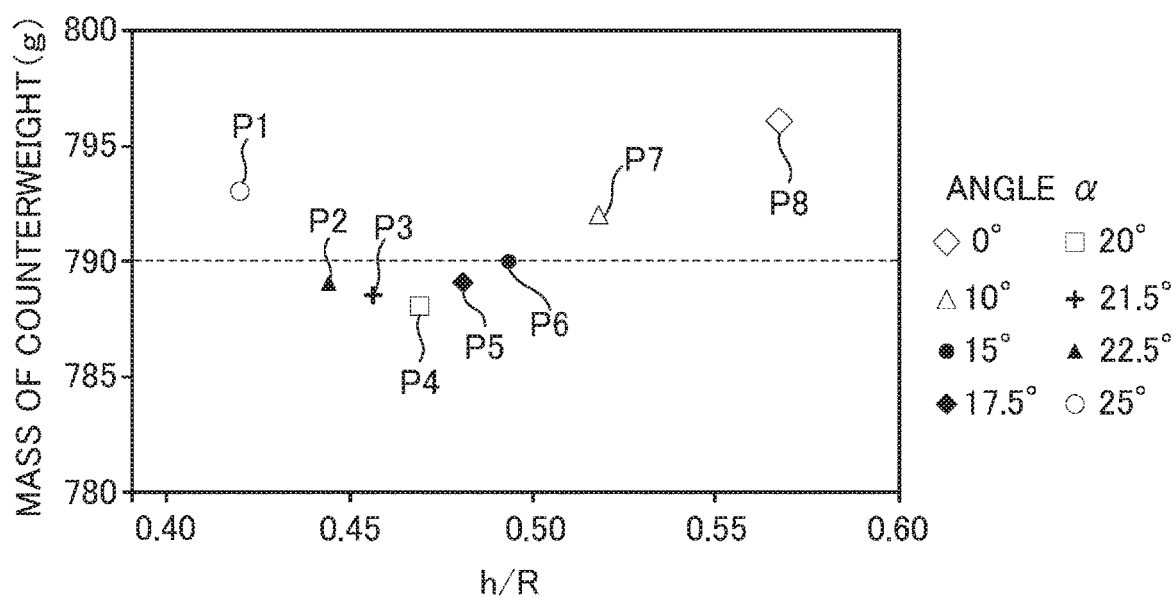
FIG. 8 is a graph showing the mass of the counterweight plotted with respect to the angle $\alpha$ and the ratio $h/R$.

On conditions that the radius R of the counterweight CW8 is 81 mm and the unbalance is constant, a forging simulation was performed to calculate the filling amount (mm$^3$) of a metallic material that varies depending on the ratio h/R and the angle α. Conditions for the calculation are as follows. Specifically, a simplified die model corresponding to the shape of the counterweight CW8 of the crankshaft C only was formed. Then, the filling amount (mm$^3$) of the metallic material per stroke of 1 mm was calculated on the assumption that a 6000-ton forging press is used to forge carbon steel JIS S45C of 1170° C. at a die temperature of 150° C. FIGS. 7 and 8 show the results.

First, as shown in FIG. 7, the angle α was set to be 0°, 10°, 20°, and 25°, and the ratio h/R was varied by 0.05 from 0.42 to 0.67 to calculate the filling amount. From the shapes with all these angles, those having the filling amount around 3577 mm$^3$ (indicated by a dotted line in FIG. 7) were extracted (P1, P4, P7, and P8 in FIG. 7). Further, the angle α was set to be 15°, 17.5°, 21.5°, and 22.5°, and the shapes having the ratio h/R at which the filling amount approaches 3577 mm$^3$ were calculated (P2, P3, P5, and P6 in FIG. 7).

Then, as shown in FIG. 8, the masses (g) of the counterweights having the shapes P1 to P8 shown in FIG. 7 were plotted with respect to the ratio h/R.

Every counterweight showed the similar filling amount irrespective of the shape as shown in FIG. 7, but the masses of the counterweights varied depending on the angle α and the ratio h/R. The counterweights CW8 with the angle α of 15° or more and 22.5° or less, and the ratio h/R of 0.44 or more and 0.49 or less (P2 to P6 shown in FIG. 8) had a mass of 790 g or lower.

The results shown in FIGS. 7 and 8 indicate that the angle α formed by the line L1 and the shoulder 14 is preferably 15° or more and 22.5° or less, more preferably 16° or more and 22° or less, much more preferably 17.5° or more and 21.5° or less. In this range, the counterweight CW8 can easily be made lightweight, while maintaining the unbalance required for the counterweight CW8, and can be filled sufficiently in the forging process.

When viewed along the crankshaft center CS1 as shown in FIGS. 5 and 6, the ratio h/R of the counterweight CW8 of this embodiment, which is the ratio of the width h of the neck 13 to the counterweight radius R, is preferably 0.44 or more and 0.49 or less, more preferably 0.45 or more and 0.48 or less.

In this range, the counterweight CW8 can be made lightweight, while keeping in balance with the filling of the counterweight in the forging process.

Other Embodiments

Other embodiments of the present disclosure will be described below. In the following description, components that have been described in the above embodiment are designated by the same reference characters, and are not described in detail.

It has been described in the above embodiment that the weight 15 of the counterweight CW8 is substantially fan-shaped. However, the shape of the weight 15 of the counterweights CW provided for the crankshaft C other than the counterweight CW8 is not limited to the substantial fan-shape. For example, as shown in FIG. 1, the weight 15 may have an appropriate shape including the substantial fan-shape to bring the inertia force into balance on the whole crankshaft C.

INDUSTRIAL APPLICABILITY

The present disclosure can provide a counterweight which can make a crankshaft lightweight and allows a counterweight portion to be filled sufficiently in a forging process of the crankshaft, and a crankshaft provided with the counterweight. Therefore, the present disclosure is particularly useful.

What is claimed is:

1. A counterweight forming a crankshaft of an engine, the counterweight comprising:
    an arm connecting a crank journal and crank pin of the crankshaft;
    a neck extending from a junction between the arm and the crank journal in a direction opposite to the crank pin with respect to a crankshaft center, and having a width smaller than a horizontal width of the junction when viewed along the crankshaft; and
    a weight continuous with a portion of the neck opposite to the arm, the weight being substantially fan-shaped when viewed along the crankshaft, wherein
    the weight has left and right shoulders continuous with the neck, each of the shoulders being tilted to be away from the neck at an angle with respect to a horizontal direction orthogonal to the crankshaft center when viewed along the crankshaft, the angle being 15° or more and 22.5° or less; and
    the crankshaft is forged into a single piece.
2. The counterweight of claim 1, wherein
    when viewed along the crankshaft, a ratio h/R of a width h of the neck to a radius R of the counterweight from the crankshaft center is 0.44 or more and 0.49 or less.
3. A crankshaft comprising the counterweight of claim 2.
4. A crankshaft comprising the counterweight of claim 1.

\* \* \* \* \*